June 6, 1944.  P. HEFTLER  2,350,353

AUTOMOBILE BRAKE AND SUSPENSION LINKAGE

Filed July 20, 1938

Paul Heftler

Patented June 6, 1944

2,350,353

UNITED STATES PATENT OFFICE 2,350,353

AUTOMOBILE BRAKE AND SUSPENSION LINKAGE

Paul Heftler, Grosse Pointe Park, Mich.

Application July 20, 1938, Serial No. 220,369

12 Claims. (Cl. 280—124)

This invention is an automobile, or, more precisely, a combination of front and rear spring suspensions and four wheel brakes that allows an automobile to be stopped by its brakes without the automobile nose-diving in front or rearing-up in back. The invention does this no matter how hard the brakes are applied and no matter how soft the springs and shock absorbers are.

All present day automobiles nose-dive and rear-up when their brakes are applied, because the retarding force caused by applying the brakes acts on the automobile at the level of the ground while the effective weight of the automobile acts at its center of gravity, which is ordinarily about twenty-four inches above the ground. Because the effective weight is out of line with the retarding force, it is thrown forward more onto the front wheels when the automobile is being stopped than when it is at rest or running at a steady speed.[1] In the ordinary car, the extra effective weight thus thrown onto the front wheels is applied to them through the front springs. This compresses the front springs more than they are normally and causes nose-diving. In a similar way, the removal of effective weight from the rear wheels allows the rear springs to lift the rear of the car above its normal position, thus causing rearing-up.

This nose-diving and rearing-up is annoying because it makes the car feel unsteady and because it tends to dump the passengers out of their seats when sudden stops are made. It is also expensive because, when two cars one in back of the other stop suddenly and the rear car runs into the front one, the bumper on the front of the rear car is below its normal position, and the bumper on the rear of the front car is above its normal position. Especially in modern cars with soft springs, the bumpers will be so far out of line that they will miss each other completely, and the bumper on the car ahead will smash the radiator grille and the front fenders of the car behind.

The earliest description in English of a construction intended to cure these faults seems to be in the British Patent No. 413,931 to André Dubonnet. Starting in 1934, when "knee action" was introduced to the American public, several million automobiles have been built in the United States, Canada, Great Britain, Germany, and Italy under licenses from Dubonnet, and the designers of those automobiles had the benefit of the disclosure of this patent. Nevertheless, these automobiles had the faults of nose-diving and rearing-up because that disclosure does not actually teach how those faults can be eliminated.

Another attempt to cure these faults is described in a U. S. patent and consists of a device for locking the shock absorbers when the automobile is being stopped. I have tested an automobile provided with such an arrangement, and it only partially prevents the nose-diving because it does not come into action fast enough. It has the further disadvantage that it spoils the comfortable ride of the automobile whenever the brakes are on. It is probably for these reasons that this arrangement has never been put on any but experimental automobiles.

A much better way of attempting to cure these faults is described in still another patent. This better way consists in making the supports for the front wheels move forwards or to rotate backwards a little as they move up with respect to the frame of the car and in doing the opposite with the rear wheels, and the patent contains formulae defining the exact movement of the wheel supports that is recommended for the best results. I have built and tested an arrangement somewhat similar to one of those shown in this patent, and I have found that, although a front suspension built according to the formulae therein and applied to an automobile with ordinary four wheel brakes greatly reduces nose-diving, it will not entirely eliminate it. This is true at all rates of retardation, in spite of the statements and mathematics in that patent. I have also found that a rear suspension built according to the formulae of that patent makes an automobile squat down in back approximately as much as a conventional suspension makes it rear up, and that one evil is merely exchanged for another. These tests thus show that there is a mistake in the prior analysis of the problem.

Although suspensions made according to the formulae referred to above greatly lessen nose-diving, they do not improve the action in back, and they have the further disadvantage that they cause the front wheels to move forward as they rise over a bump, which is undesirable because it makes the wheel meet a bump faster than the rest of the automobile and has the effect of making all the bumps in the road seem to be steeper than they are in reality.

My present invention is a combination of front and rear suspensions and a four wheel braking system so related and interconnected that there

[1] The term "effective weight," as used here, is synonymous with the word "weight" as used in everyday conversation in such expression as: He threw his weight against the door. As so used, it may be accurately defined as the vector sum of the forces of gravity and inertia.

is no nose-diving, no rearing-up, and no sinking or rising of the car as a whole. Not only are these faults all eliminated, but they are eliminated even in cars having more effective weight on the wheels at one end of the car than at the other even when the car is at rest, and they are eliminated even in cars in which the braking effort is not equally divided between the front and rear wheels. I have found that, contrary to what has been taught and believed hitherto, the correct solution of this problem has nothing to do with the distance between the wheels and the center of gravity, the rate of the springs, the coefficient of friction between the tire and the road, or the mass of the car. The correct solution involves only the wheelbase, the height of the center of gravity, and in what proportion the braking effort is divided between front and rear wheels.

Figure 1:
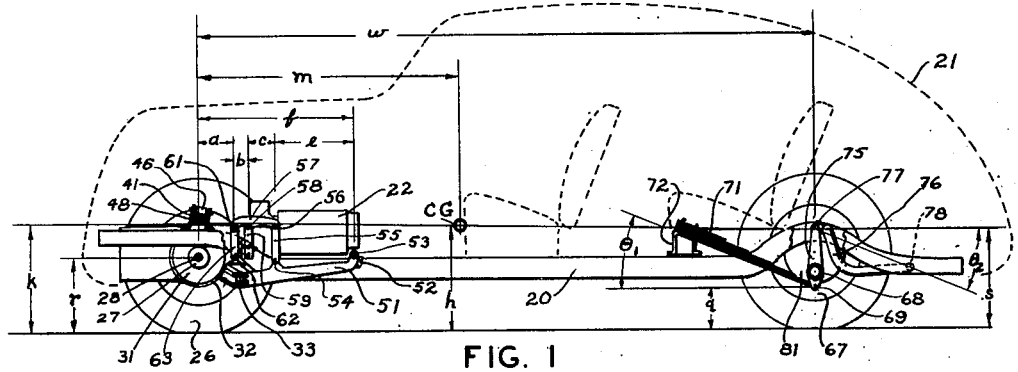
Figure 1 is a side view of a car embodying my invention, in which the body and the seats are shown in dotted outline and the wheels on the near side have been removed, the axles broken off and the frame broken away in places to show the invention better.

The automobile shown in the drawing has a comparatively light frame 20 which is bolted to a body of the type used on the "Lincoln Zephyr" and indicated by the outline 21, the body providing the strength and rigidity lacking in the frame. This particular car has a front wheel drive, and, in order to allow room for the drive, the engine 22 is a four cylinder horizontal opposed or pancake engine. Ahead of it are a clutch 23, final drive and differential 24 and change speed gearbox 25 made like those used in the "Cord" and described in detail in the January 1936 issue of the "Automobile Engineer."

The drive to each of the front wheels 26 is through a constant velocity universal joint 27 driven from the differential, a propeller shaft 28 provided with a telescoping joint, and a second constant velocity universal joint 29 out near the wheel 26. The brakes, instead of being mounted on the wheels, are placed right alongside of the differential 24, the brake drums 31 being fastened to the final drive shafts coming from the differential and driving the inner universals 27. The brake anchor plates 32 are not fixed but instead are mounted on bearings surrounding and concentric with the final drive shafts. They are prevented from spinning around when the brakes are applied by a linkage described below.

The front suspension includes an axle 33 whose central portion is straight and horizontal and placed about eight inches behind the axis of the front wheels 26. This allows it to clear the differential 24. At the same time, it clears the flywheel and clutch 23 whose lower portion lies directly behind it.

The ends 34 of the front axle extend forward and upward from the ends of the straight central portion and are formed into forks which carry the steering knuckles, this construction being similar to that on the "Cord." The upper branches of the axle forks are also provided with spring perches 39 and 40 to which are connected the ends of a transverse leaf spring 41. One end 42 of the spring may be pivoted directly to its perch 39, and the other end 43 may be connected to its perch 40 by a spring shackle 44, or both ends may be provided with shackles.

The top leaf 45 of the front spring 41 extends out about three inches beyond the frame 20 at each side, and each end curves back upon itself and is formed into an eye 46 directly above the side rail of the frame 20. A thin pad of rubber lies directly under each of the eyes in the upper spring leaf 45 between the eye and the straight part of the leaf, and similar pads of rubber are placed directly underneath it between each of the other leaves. The ends of the other leaves come at equal spaces between the curled back portion of the top leaf 45 and the end of the bottom or main leaf, and each leaf has a rubber pad between it and the outermost portion or end of the leaf above. Suitable spring clips are provided, especially just outside of the eyes 46 in the top leaf, and the center of the spring is held firmly together by a clamp. If desired, each of the leaves may be provided with an upward hump at its center fitting into a hollow in the leaf above it.

The two eyes 46 in the top leaf of the spring 41 are pivoted on brackets 48 carried by the frame 20. This arrangement of the spring pivoted at its ends to the axle and at two intermediate points to the frame permits the entire spring to flex evenly when the two wheels move up and down together but permits very little flexing of the central part when only one wheel moves or when the two wheels move in opposite directions. This makes the suspension less likely to shimmy when the wheels are out of balance or when the steering connections have become worn and loose.

The axle 33 is positioned fore and aft by a pair of torque or radius arms 51, one at each side of the frame 20. The forward ends of the torque arms 51 are rigidly bolted to the axle 33 at the ends of its straight central portion, and the rear ends are secured to brackets 52 on the frame by means of pivots 53. These pivots should be of a type like "Harris" rubber bushings that allow a small amount of universal movement as well as rotation about their principal axis. The forward ends of the torque arms are relatively thin so that they can bend sideways; this allows the axle to be positioned sideways by the spring 41 without subjecting the torque arms or other parts to large stresses.

The above described arrangement of an axle with two torque arms pivoted to the frame at spaced points causes the central part of the axle lying between the two torque arms to be twisted whenever one end of the axle rises relative to the other. The axle, being made of heat treated alloy steel, functions as a spring to resist such movement and thus helps to make the suspension further proof against shimmy.

About a third of the way back from its front end, each torque arm 51 carries a pivot 54 through which the braking system is connected to the suspension. This connection includes a vertical link 55 which joins the pivot 54 on the torque arm to a pivot 56 on a horizontal lever 57. The horizontal lever 57 is carried by a fulcrum 58 on a bracket 59 fixed to the frame 20. The other end of the lever 57 carries a pivot 61 which is connected to a pivot 62 on the brake anchor plate 32 by a vertical link 63. This is the connection which keeps the brake anchor plate from spinning around when the brakes are applied, and it is the linkage of which this connection is a part that, in connection with the rear suspension, keeps the car level when the brakes are applied. How it does this will be explained after the rear suspension is described.

The rear suspension

The rearwheels 67 are carried at the ends of a dead tubular axle 68, the main part of which lies several inches below the axis of the wheels. A spring perch 69 is welded to the underside of the axle near each end and provides a pivot for the end of a longitudinally extending "quarter elliptic" leaf spring 71. The two leaf springs 71, one at each side of the car extend forward and up at a slight angle to the horizontal, and their forward or butt ends are bolted to the ends of a large box-section cross member 72 on the frame. This cross member lies under the forward edge of the rear seat, where there is room for it, and the front ends of the springs 71 are spread apart so as to come under the extreme ends of the seat where a few short springs in the seat cushion will not matter.

The center of the axle 68 has welded to it an upright post 75 whose upper end is pivoted to the center of a large wishbone link 76. The pivot 77 may be a ball-and-socket joint or some other form of joint, such as a "Harris" rubber bushing, that will allow a small amount of universal movement. The ends of the wishbone link 76 are secured to the frame 20 about a foot and a half behind the axle 68 by means of pivots 78 which are several inches lower than the pivot 77 at the center of the link. The wishbone link 76 may be flat and A-shaped, but if it is made approximately semi-circular in plan, as shown, it will allow room for the spare tire 79, and if it is made L-shaped as seen from the side, as shown, it will interfere very little with the luggage space above the tire.

The rear brakes 81 are carried at the ends of the axle 68 in the conventional manner and act on brake drums secured directly to the rear wheels 67.

The right proportions

The above described combination of suspensions and braking systems will more or less prevent nose-diving and rearing-up if it is made with proportions not differing greatly from those shown in the drawing. But, unless the proportions are exactly right, there will be some nose-diving, rearing-up, or rising or sinking of the body. The right proportions can be most easily given by equations in which the symbols have the following meanings:

$a$ is the distance from the axis of the brake anchor plate 32 to the pivot 62 by which it is connected to the horizontal lever 57.

$b/c$ is the ratio between the length of the arm of the horizontal lever 57 connected to the brake anchor plate 32 and the length of the arm connected to the torque arm 51.

$e$ is the distance from the pivots 54 at which the torque arms 51 are connected to the horizontal levers 57 to the axis of the pivots 53 between the torque arms and the frame, this distance being measured horizontally.

$f$ is the distance from the pivots 53 of the torque arms 51 to the frame to the axis of the front wheels 26.

$h$ is the height of the center of gravity CG of the car.

$q$ is the height of the pivots or spring perches 69 by which the rear springs 71 are connected to the rear axle 68.

$s$ is the height of the pivot 77 by which the center of the wishbone link 76 is connected to the top of the post 75 at the center of the rear axle.

$k$ is the height of the main leaf of the front spring 41.

$m$ is the distance from the axis of the front wheels to the center of gravity CG measured horizontally.

$w$ is the length of the wheelbase.

$F/R$ is the ratio of the braking effort applied to the front wheels to the braking effort applied to the rear wheels.

$\theta_1$ is the angle to the horizontal of a plane passed through the main leaves of the two rear springs 71.

$\theta_2$ is the angle to the horizontal of a plane passed through the three pivots 77 and 78 of the wishbone link 76.

Figure 2:
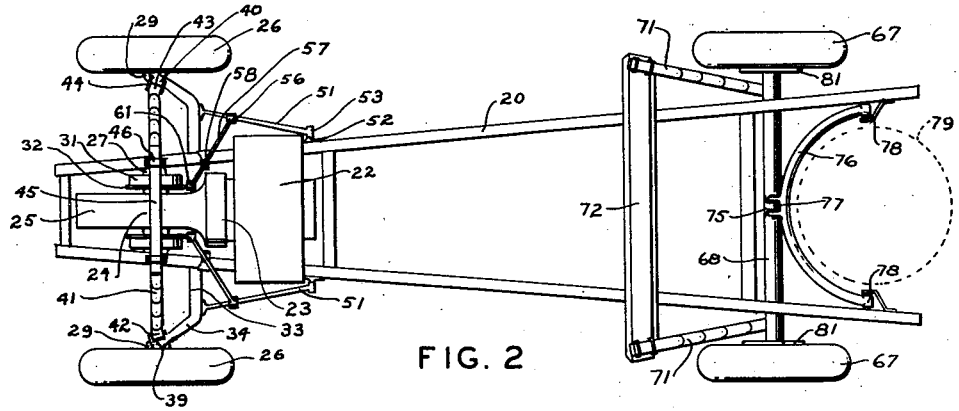
Figure 2 is a plan view of the chassis of the car.

$\theta$ is the angle to the horizontal of a plane extending up and forwards from the spots where the rear wheels 67 touch the ground. (See Figure 2.) Both $\theta_1$ and $\theta_2$ in the rear suspension shown in Figure 1 are equal to $\theta$.

Some of these symbols do not enter into the proportions of the suspension at this point, but all are given here in order to have them all at one place in this description. Also, the following can be derived at a glance from the definition of $F/R$:

$\frac{R}{F+R}$ is the fraction or percentage of the total braking effort that is applied to the rear wheels.

$\frac{F}{F+R}$ is the fraction or percentage of the total braking effort that is applied to the front wheels.

The correct proportions for the front suspension and brake linkage are given by the following equation:

$$\frac{eb}{ac} = \frac{hf}{wr\frac{F}{F+R}}$$

The correct proportions for the rear suspension are given by the following equation:

$$\text{tangent } \theta = -\frac{h}{w\frac{R}{F+R}}$$

That these proportions are correct is shown in the following analysis:

Why it works

Before starting the mathematical explanation of how the invention works, it may be well to give a little of the underlying theory.

Every suspension can be regarded as being made up of links which guide the wheel or wheels relative to the body or frame of the car and of springs which push the wheel down relative to the body or frame. This is obvious in coil spring suspensions. In leaf spring suspensions, it is still true but less obvious, for the leaf springs function both as links and as springs. For example, in the rear suspension described above, the leaf springs function as simple links pivoted at each end and as springs pushing down on the axle. They could be readily replaced by one such link on each side and by a pair of coil springs acting between the frame and the axle. In the following explanation, the term link includes leaf springs insofar as they are acting like links.

Whenever a brake is applied to a rolling wheel, certain changes occur in the forces acting between the ground and the wheel. With a freely rotating wheel, the only force between it and the ground is a pressure perpendicular to the ground. When the brake is applied, there is created a retarding force parallel to and at the level of the ground, and at the same time there is a change in the pressure between the ground and the wheel caused by the shifting of the weight of the vehicle mentioned at the beginning of this description. This change in pressure at the ground can be regarded as a separate force since it will be convenient to do so. There are, then, two forces, a horizontal one and a vertical one, which come into being where the wheel touches the ground when the brake is applied.

These two forces are transmitted to the body or frame of the car by the suspension, the linkage ordinarily transmitting some portion of them and the springs the remainder. In any practical suspension, that portion of these forces transmitted from the front wheels by the links and not by the springs will have, as a resultant, a single force acting towards the rear of the car and perhaps horizontal, perhaps sloping up or perhaps sloping down. In any case, this resultant will pass through a line joining the spots where the front wheels touch the ground and, if the brakes are equalized, will lie in the plane of symmetry or longitudinal vertical median plane of the car. Similarly, the linkage of the rear suspension will transmit to the frame braking forces having a single resultant passing through a line joining the spots where the rear wheels touch the ground and also lying in the plane of symmetry of the car. These two resultants, unless they are parallel, meet at some point. If they are parallel, they meet at an imaginary point at infinity. As the discoverer of this point, I have named it the "center of braking" and labeled it CB on the drawing.

The two resultants mentioned above have a single resultant which passes through the center of braking and which is the grand resultant of all the forces brought into action by the application of the brakes and transmitted to the frame or body by the linkages of the suspensions and brakes and not transmitted by the springs acting as springs. This grand resultant is the important force because, at the instant that the brakes are applied, the springs have not had time to change their deflections, and the only forces that can be transmitted from the wheels to the frame or body are those that are transmitted by the linkage and which combine to form this grand resultant. Whether the car nose-dives, rears-up, pole-vaults in front, squats down in back, rises bodily or sinks bodily when the brakes are applied depends only on the position of the center of braking relative to the center of gravity and on the direction of the grand resultant braking force acting through the center of braking. None of these movements will take place, and the car will stop absolutely steadily if the center of braking is directly ahead or behind or coincident with the center of gravity and if the grand resultant of all the braking forces transmitted by the links of the suspension and braking system is horizontal.

Figure 3:
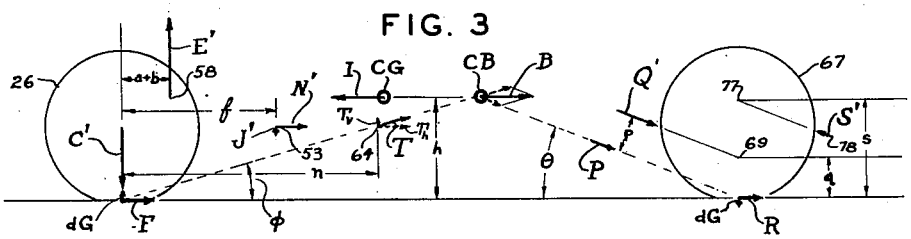
Figure 3 is a diagram of the forces brought into action by the application of the brakes and acting on the car as a whole or on the frame of the car.

My invention is based on the above underlying theory which I have developed, and it consists of linkages that will produce the correct resultant described above. Figures 3 to 8 show diagrammatically how this is done, Figure 3 showing the forces applied by the road to the wheels and caused by applying the brakes and the forces applied by the linkage of the suspensions and brakes to the frame of the car and caused by applying the brakes, while Figures 4 to 8 show, step by step, how the forces applied by the road to the wheels cause the forces applied by the linkages to the frame.

Figure 4:
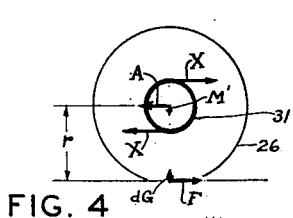
Figure 4 is a diagram of the forces brought into action by the application of the brakes and acting on the front wheels and the front brake drums.
Figure 5:
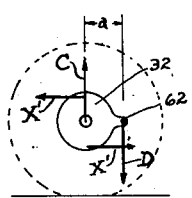
Figure 5 is a diagram of the forces brought into action by the application of the brakes and acting on the anchor plates of the front brakes.

If F/R is the ratio of the front braking force to the rear braking force (as defined above in giving the correct proportions for the linkages), then F and R are the retarding forces exerted by the ground on the front and rear wheels respectively. Considering first the front of the car, the two wheels 26 are pushed back by the force F exerted on them by the ground where they touch it, and they are pushed forward by their bearings at their centers with a force A, as shown in Figure 4. Obviously, $$F = A \qquad (1)$$

The two forces, F and A, being out of line a distance $r$, exert a couple $Fr$ on the wheels. This couple is transmitted to the brake drums 31 by the universal joints 27 and 29 and the propeller shafts 28. It is balanced at the brake drums by the forces exerted on them by the brake shoes and represented symbolically by the couple formed by two forces X and X.

The forces exerted on the brake shoes and brake backing or anchor plates 32 by the brake drums 31 are equal and opposite to those represented by the two forces X and X. They are therefore represented in Figure 5 by the two forces X' and X', and they form a couple also equal to $Fr$. This couple is balanced by another couple formed by the force D with which the anchor plate reaction links 63 push down on the pivots 62 on the anchor plates 32 and by the force C exerted up at the centers of the anchor plates by the bearings which carry them. Obviously:

$$D = C \qquad (2)$$

and the couple which they form is equal to the couple represented by the forces X' and X' which in turn is equal to the couple $Fr$. Therefore:

$$Ca = Fr$$

$$C = F\frac{r}{a} \qquad (3)$$

Since the brake anchor plates push down on their central bearings just as hard as the bearings push up on the anchor plates, there will be a force C' equal to C acting down on the frame as shown in Figure 3. Setting C' equal to the value of C given in Equation 3 gives:

$$C' = F\frac{r}{a} \quad (4)$$

The links 63 between the brake anchor plates 32 and the horizontal levers 57 push up on the levers at the pivots 61 just as hard as they push down on the brake anchor plates. Calling this force pushing up on the levers 57 by the term D', setting it equal to D (the push down on the anchor plates), and getting the value of D from Equations 2 and 3 gives:

$$D' = F\frac{r}{a} \quad (5)$$

Figure 7:
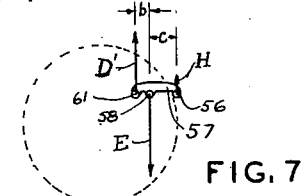
Figure 7 is a diagram of the forces brought into action by the application of the brakes and acting on the levers connecting the anchor plates of the front brakes to the torque or radius arms of the front suspension.

As shown in Figure 7, the force D' at the forward ends of the horizontal lever 57 can be balanced only by a force E acting at their fulcrums 58 and another force H acting at their rear pivots or ends 56. Taking moments about the axis of the rear pivots 56 gives:

$$Ec - D'(b+c) = 0$$

$$E = D'\left(\frac{b+c}{c}\right)$$

Substituting the value of D' from Equation 5 gives:

$$E = F\frac{r(b+c)}{ac} \quad (6)$$

The force E is the force exerted by the frame on the horizontal levers 57 at their fulcrums 58. Obviously, they will exert an equal and opposite force E' on the frame as shown in Figure 3. Setting E' equal to the value of E as given in Equation 6 gives:

$$E' = F\frac{r(b+c)}{ac} \quad (7)$$

To find the force H at the rear ends of the levers 57, the sum of the moments about the axis of their fulcrums is set equal to zero, as follows:

$$Hc - D'b = 0$$

Taking the value of D' from Equation 5 and substituting gives:

$$Hc - F\frac{rb}{a} = 0$$

$$H = F\frac{rb}{ac} \quad (8)$$

H is the force with which the links 55 push up on the horizontal levers 57. They therefore push down on their pivots 54 on the torque arms 51 with an equal force H'. Therefore:

$$H' = F\frac{rb}{ac} \quad (9)$$

Figure 8:
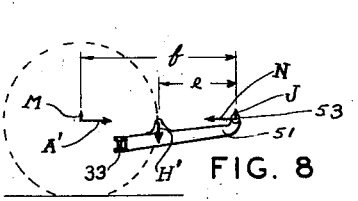
Figure 8 is a diagram of the forces brought into action by the application of the brakes and acting on the torque or radius arms of the front suspension.

As shown in Figure 8, the force H' on the torque arms 51 is balanced by a lifting force J exerted by the frame at the torque arm pivots 53 and by another lifting force M exerted by the wheels 26 on the axle 33 to which the torque arms are bolted. The lifting force M exerted by the wheels is exerted at their centers to which the bent-forward ends of the axle are connected. To find the value of M, the moments of the forces acting on the torque arm and axle assembly is set equal to zero, the axis of the pivots 53 of the torque arms to the frame being taken as the center, thus:

$$Mf - H'e = 0$$

Substituting the value of H' from Equation 9, gives:

$$Mf - F\frac{rbe}{ac} = 0$$

$$M = F\frac{rbe}{acf} \quad (10)$$

Substituting in Equation 10 the value of $$\frac{eb}{ac}$$

which was given to it in defining the proper proportions for the linkages gives:

$$M = F\frac{r}{f} \cdot \frac{hf}{wr\frac{F}{F+R}}$$

$$M = \frac{h}{w}(F+R) \quad (11)$$

To find the value of the lifting force J exerted by the frame on the ends of the torque arms 51 pivoted to it, the sum of the moments of the forces acting on the torque arm and axle assembly is set equal to zero, the axis of the wheels 26 being taken as the center, thus:

$$Jf - H'(f-e) = 0$$

Substituting the value of H' from Equation 9 gives:

$$Jf - F\frac{rbf}{ac} + F\frac{rbe}{ac} = 0$$

$$J = F\frac{rbf}{acf} - F\frac{rbe}{acf}$$

$$J = F\frac{rb(f-e)}{acf} \quad (12)$$

J being the lifting force exerted by the frame on the torque arms 51, the force exerted by the torque arms on the frame will be an equal and opposite force J' shown in Figure 3. Thus:

$$J' = F\frac{rb(f-e)}{acf} \quad (13)$$

The torque arm and axle assembly is what pushes the front wheels forward with the force A shown in Figure 4. The wheels therefore push the torque arm and axle assembly back with an equal force A'. Since A' equals A and A equals F according to Equation 1, then:

$$A' = F \quad (14)$$

The force A' is balanced by an equal force N exerted on the torque arms at their pivots 53 as shown in Figure 8. From this equality and from Equation 14, it is seen that:

$$N = F \quad (15)$$

Since the force N is exerted on the torque arms 51 at their pivots 53, it is obvious that the torque arms exert an equal and opposite force N' on the frame at those pivots 53 as shown in Figure 3. Since N' equals N and, according to Equation 15, N equals F, it follows that:

$$N' = F \quad (16)$$

Every force brought into existence by the application of the brakes and acting on the forward part of the car through the suspension and braking linkages has now been found and its value determined. Their resultant may now be found as follows. The sum of the vertical components of all the forces is set equal to the vertical component of the resultant T, thus:

$$-C' + E' - J' = T_v$$

Substituting the values of these forces as given by Equations 4, 7 and 13 gives:

$$T_v = -F\frac{r}{a} + F\frac{r(b+c)}{ac} - F\frac{rb(f-e)}{acf}$$

$$T_v = -F\frac{rcf}{acf} + F\frac{rbf+rcf}{acf} - F\frac{rbf-rbe}{acf}$$

$$T_v = \frac{F}{acf}(-rcf + rbf + rcf - rbf + rbe)$$

$$T_v = \frac{F}{acf}(rbe)$$

$$T_v = \frac{eb}{ac}F\frac{r}{f} \tag{17}$$

Substituting in this the value of $$\frac{eb}{ac}$$

given in defining the correct proportions for the linkages gives:

$$T_v = \frac{hf}{wr\frac{F}{F+R}}F\frac{r}{f}$$

$$T_v = \frac{h}{w}(F+R) \tag{18}$$

To find the position of $T_v$, that is, its distance $n$ from the axis of the front wheels, its moment about that axis is set equal to the moment of the vertical components of the forces of which T is the resultant, as follows:

$$T_v n = E'(a+b) - J'f$$

Substituting the values of $T_v$, $E'$ and $J'$ as given in Equations 17, 7 and 13 gives:

$$\frac{F}{acf}(rbe)n = F\frac{r(b+c)}{ac}(a+b) - F\frac{rb(f-e)}{acf}f$$

$$F\frac{rbe}{acf}n = F\frac{rbe}{acf}\frac{f(b+c)(a+b)}{be} - F\frac{rbe}{acf}\frac{f(f-e)}{e}$$

$$n = \frac{f(b+c)(a+b)}{be} - \frac{f(f-e)}{e}$$

$$n = \frac{f(ab+b^2+ac+cb)}{be} + \frac{f(bf-be)}{be}$$

$$n = \frac{f(ab+b^2+cb-bf+be)}{be} + \frac{acf}{be}$$

$$n = \frac{f(a+b+c+e-f)}{e} + \frac{acf}{be}$$

But, according to Figure 1, $(a+b+c+e)$ is equal to $f$. Therefore:

$$n = \frac{acf}{be}$$

Substituting in this the value of $$\frac{eb}{ac}$$

given in defining the correct proportions for the linkages gives:

$$n = f\frac{wr\left(\frac{F}{F+R}\right)}{hf}$$

$$n = \frac{wr}{h}\frac{F}{(F+R)} \tag{19}$$

The horizontal component $T_h$ of the resultant T of all the forces caused to act on the forward part of the frame by the application of the brakes is obviously equal to the only horizontal force $N'$, all of the other forces being vertical. Taking the value of $N'$ from Equation 16 gives:

$$T_h = F \tag{20}$$

The angle $\phi$ to the horizontal at which the resultant T of the front braking forces acts can be defined by its tangent, the tangent being equal to the ratio of the vertical and horizontal components, thus:

$$\text{tangent } \phi = \frac{T_v}{T_h}$$

Substituting the values of $T_v$ and $T_h$ given in Equations 18 and 20, $$\text{tangent } \phi = \frac{h(F+R)}{wF}$$

$$\text{tangent } \phi = \frac{r}{\frac{wr}{h}\left(\frac{F}{F+R}\right)} \tag{21}$$

Substituting in this the value of $n$ given by Equation 19 gives:

$$\text{tangent } \phi = \frac{r}{n}$$

Hence the line of action of the resultant T of the braking forces transmitted to the frame by the linkages at the front of the car passes directly between the spots where the front wheels touch the ground.

Figure 6:
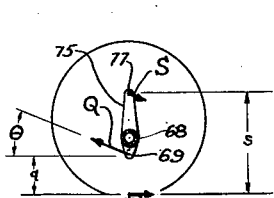
Figure 6 is a diagram of the forces brought into action by the application of the brakes and acting on the rear wheel and axle assembly.

The analysis of the rear suspension is much simpler than that of the front suspension. Both the wishbone link 76 and the springs 71, insofar as they act as links, can transmit forces that lie only in their planes, as shown in Figure 6. The magnitude of the force Q exerted by the springs 71 on their spring perches 69 when the brakes are applied can be found by setting equal to zero the sum of the moments of all the braking forces acting on the rear wheel and axle assembly, taking the pivot 77 of the wishbone link 76 to the upright post 75 as a center, thus:

$$Rs - Q(s-q)\cos\theta = 0$$

$$Q = \left(\frac{s}{s-q}\right)\frac{R}{\cos\theta} \tag{22}$$

Similarly, the value of the force exerted by the link 76 can be found by setting equal to zero the sum of the moments acting about the spots where the rear wheels touch the ground, thus:

$$Ss\cos\theta - Qq\cos\theta = 0$$

$$S = Q\frac{q}{s}$$

Substituting in this the value of Q given by Equation 22 gives:

$$S = \left(\frac{q}{s-q}\right)\frac{R}{\cos\theta} \tag{23}$$

The forces $S'$ and $Q'$, shown in Figure 3, which the link 76 and the rear springs 71 acting as links exert on the frame are equal and opposite to the forces S and Q which they exert on the rear axle assembly. Hence, by reference to Equations 22 and 23:

$$Q' = \left(\frac{s}{s-q}\right)\frac{R}{\cos\theta} \tag{24}$$

and $$S' = \left(\frac{q}{s-q}\right)\frac{R}{\cos\theta} \tag{25}$$

The resultant P of S' and Q' is equal to their algebraic sum, thus:

$$P = Q' - S'$$

$$P = \left(\frac{s}{s-q}\right)\frac{R}{\text{cosine } \theta} - \left(\frac{q}{s-q}\right)\frac{R}{\text{cosine } \theta}$$

$$P = \frac{R}{\text{cosine } \theta} \qquad (26)$$

The line of action of P is obviously parallel to those of its components, Q' and S'. Its distance $p$ from the line of action of Q' can be found by setting its moment about a point on the line of action of Q' equal to the similar moment of S', thus:

$$Pp = S'(s-q) \text{ cosine } \theta$$

Substituting the value of S' from Equation 25 and of P from Equation 26 gives:

$$\frac{R}{\text{cosine } \theta} p = \left(\frac{q}{s-q}\right) \frac{R}{\text{cosine } \theta} (s-q) \text{ cosine } \theta$$

$$p = q \text{ cosine } \theta \qquad (27)$$

Hence, the line of action of P intersects the ground at a point in line with the spots where the rear wheels touch the ground, as shown in Figure 3.

The horizontal and vertical components $P_h$ and $P_v$ of P are as follows:

$$P_h = P \text{ cosine } \theta$$

Substituting the value of P given by Equation 26 gives:

$$P_h = \frac{R}{\text{cosine } \theta} \text{ cosine } \theta$$

$$P_h = R$$

$$P_v = P \text{ sine } \theta \qquad (28)$$

Substituting the value of P given by Equation 26 gives:

$$P_v = \frac{R}{\text{cosine } \theta} \text{ sine } \theta$$

$$P_v = R \text{ tangent } \theta$$

Substituting for tangent $\theta$ the value given to it in defining the correct proportions for the linkages gives:

$$P_v = -R \frac{h}{w\frac{R}{F+R}}$$

$$P_v = -\frac{h}{w}(F+R) \qquad (29)$$

The resultant of the thrust T from the linkages at the front and the pull P from the linkage at the rear is the grand resultant braking force B referred to before. Its horizontal and vertical components are the sum of the horizontal and vertical components of the thrust T and the pull P. Thus:

$$B_h = T_h + P_h$$

Taking the values of $T_h$ and $P_h$ from Equations 20 and 28 gives:

$$B_h = F + R$$

$$B_v = T_v + P_v \qquad (30)$$

Taking the values of $T_v$ and $P_v$ from Equations 18 and 29 gives:

$$B_v = \frac{h}{w}(F+R) - \frac{h}{w}(F+R)$$

$$B_v = 0 \qquad (31)$$

Since its vertical component is zero, the grand resultant braking force B is equal to its horizontal component $B_h$, and $$B = F + R \qquad (32)$$

To find the height above the ground at which the braking force B acts, a system of Cartesian coordinates is established with the origin in line with the front wheels 26 where they touch the ground, and the equations of the lines of action of the front braking thrust T and the rear braking pull P are set up, as follows:

$$y = x \text{ tangent } \phi \qquad (33)$$

and $$y = (x-w) \text{ tangent } \theta \qquad (34)$$

Solving these simultaneously for $y$ gives:

$$y = \left(\frac{y}{\text{tangent } \phi} - w\right) \text{ tangent } \theta$$

Substituting in this the values of tangent $\phi$ and tangent $\theta$ given in Equation 21 and in defining the proper proportions for the linkages, gives:

$$y = \frac{y}{-\frac{h(F+R)}{wF}} \frac{h}{w\frac{R}{F+R}} + \frac{hw}{w\frac{R}{F+R}}$$

$$y = -y\frac{F}{R} + \frac{h(F+R)}{R}$$

$$y\left(\frac{R+F}{R}\right) = \frac{h(F+R)}{R}$$

$$y = h \qquad (35)$$

Thus the center of braking CB is at the same height as the center of gravity CG. Because of this and because the braking force B and the inertia force I are both horizontal and act at the centers of braking and gravity respectively, there is no couple tending to make the car nose-dive or rear-up or pole-vault in front or squat down in back, and there is no unbalanced force tending to make the car rise or sink.

*A few loose ends*

Although the analysis of the linkages has been carried far enough to show that they work as intended, there remain a few lose ends that may well be disposed of. The first of these, the longitudinal position of the center of braking CB, is found by substituting the value of $y$ from Equation 35 into Equation 33, as follows:

$$h = x \text{ tangent } \phi$$

$$x = \frac{h}{\text{tangent } \phi}$$

$$x = \frac{h}{\frac{h(F+R)}{wF}}$$

$$x = w\frac{F}{F+R} \qquad (36)$$

Thus the fore and aft location of the center of braking is dependent on the distribution of the braking effort between the front and rear wheels and not on the position of the center of gravity.

Two more "loose ends" are the origin of the form M lifting the ends of the front axles, as shown in Figure 8, and the force necessary to balance the vertical components of the sloping forces Q and S acting on the rear axle assembly.

Since the front wheels lift the front axle with a force M, the axle must push down on the wheels with an equal and opposite force M', as shown in Figure 4. Taking the value of M from Equation 11 shows that:

$$M' = \frac{h}{w}(F+R) \quad (37)$$

The only place at which another vertical force can act on the front wheels is at the ground, so there must be an increase $dG$ in the pressure between the wheel and the ground equal to $M'$. By setting $dG$ equal to the value of $M'$ given in Equation 37, it is found that:

$$dG \text{ (at the front)} = \frac{h}{w}(F+R) \quad (38)$$

At the rear, the difference between the vertical components of the forces Q and S acting on the rear axle assembly as shown in Figure 6 is also obviously balanced by a change $dG$ in the pressure exerted by the ground on the wheels. Therefore:

$$dG \text{ (at the rear)} = Q \sin\theta - S \sin\theta$$

Substituting the values of S and Q given by Equations 22 and 23:

$$dG \text{ (at the rear)} = \left(\frac{s}{s-q}\right)\frac{R \sin\theta}{\cos\theta} - \left(\frac{q}{s-q}\right)\frac{R \sin\theta}{\cos\theta}$$

$$dG \text{ (at the rear)} = R \tan\theta$$

$$dG \text{ (at the rear)} = -\frac{h}{w}(F+R) \quad (39)$$

By comparing Equations 38 and 39, it is seen that the change $dG$ in the pressure of the ground is numerically the same at the front and the rear but is an increase at the front and a decrease at the rear. This change $dG$ is the shift of the weight of the car from the rear to the front wheels.

*No sidesway*

Among the advantages of the suspension arrangement described above and illustrated in the drawing is the absence of sidesway or roll on curves. This is accomplished by placing the front spring 41 and the pivot 77 between the rear axle assembly and the wishbone link 76 high enough so that a line drawn through the center of the main leaf of the spring 41 and the pivot 77 will pass through the center of gravity CG, as shown in Figure 1. Mathematically expressed, the relation between these heights and the position of the center of gravity is as follows:

$$k(w-m) + sm = hw \quad (40)$$

In the arrangement illustrated, $k$ and $s$ are not quite equal, $k$ being a little larger. When they are equal, as may be the case if desired, Equation 40 may be converted into the following simple equation:

$$k = s = h \quad (41)$$

*Conclusion*

While I have described only one of the preferred forms of my invention, it can, in its broadest aspects, be carried out by linkages somewhat different from the particular arrangement which I have shown and described as long as they are proportioned to give the same balance of forces. For example, the leaf springs 71 at the rear may be replaced by links pivoted to both the axle and the frame and coil springs placed between brackets on the frame and axle to carry the weight of the car, or other forms of springs may be used. The entire arrangement shown at the front may be used at the rear in a rear-engine, rear-drive car, the steering being omitted at the rear if desired. The engine, which is a four cylinder one with the arrangement of crankshaft, firing order and manifolding disclosed in my copending application for improvements in automobiles, Serial No. 123,750, filed February 3, 1937, may be replaced by other types of engines, preferably compact ones such as the V-8. The wishbone link of the rear suspension may be placed ahead of the axle instead of behind it, and the angles of the springs and the link with the horizontal may differ from each other as long as they fulfill the relation defined in the claims. The pivot between the wishbone link may be a ball and socket joint or a rubber joint of the type shown in Figure 13 of my application mentioned above. Besides those mentioned, it will be obvious that many other changes fall within the scope of the following claims.

In the claims, the terms used are to be given the broadest interpretations consistent with the true spirit of the invention. For example, the word "frame" means the frame or body or whatever serves as a frame or as part of the frame. The term "wishbone link" means not only a V-shaped or U-shaped link but also any type of link, such as a T-shaped one, which can be pivoted at two spaced points to one member and at another point to another member. The term "brake drum" means whatever part is connected to rotate with the wheel, whether it is a drum as in ordinary brakes or disks as in disk brakes. The term "link" means not only a rigid link but also a leaf spring, such as the rear springs 71 insofar as they function as links. The term "spring" means not only a metal spring but includes any combination of rubber, pneumatic cylinders, or flexible chambers and links or levers that can function as a spring. The term "force" means not only an entire force but also any increase or decrease or component of force brought into being by the application of the brakes. The term "height" means the height above the ground.

I claim as my invention:

1. In a vehicle having a frame resiliently supported on two pairs of wheels and having brakes on all four wheels with the braking effort unequally distributed between the front and rear wheels, a linkage interconnecting one pair of wheels and its brakes and the frame and proportioned so that the retarding force caused by the brakes on that pair of wheels and the change in the pressure of the ground under those wheels when the brakes are applied and shift the effective weight of the vehicle a little from the rear wheels to the front wheels are transmitted to the frame entirely by the linkage as a single resultant force acting through a point between the spots where that pair of wheels touches the ground and at an angle to the horizontal whose tangent is equal to the height of the center of gravity of the vehicle divided by the product of the wheelbase of the vehicle and the fraction of the total braking effort that is applied to that pair of wheels.

2. In a motor vehicle, a frame, a pair of wheels near one end of the vehicle, springs for supporting the frame on the wheels, brake drums connected to rotate with the wheels, brake anchor plates associated with the brake drums, means for applying a braking effort from the brake anchor plates to the brake drums in an unequal distribution between the front and the rear wheels, and linkages connecting the anchor plates and the wheels and the frame, the linkages being proportioned so that, when the brake drums are locked to the brake anchor plates and the wheels are moved up and down with respect to the frame, the paths of points on the bottoms of the wheels will be tangent to or lie in a plane passing through those points in their mid-positions and sloping up and away from the center of gravity of the vehicle at an angle to the vertical whose tangent is equal to the height of the center of gravity divided by the product of the wheelbase and the fraction of the braking effort applied to that pair of wheels.

3. In a vehicle having a frame spring supported on front and rear wheels and having front and rear brakes with the braking effort unequally distributed between the front and the rear wheels, a linkage for interconnecting the wheels and the brakes and the frame at one end of the vehicle and for exerting a vertical force between those wheels and the frame, the direction and magnitude of that force being given by the expression $$I\frac{h}{w}$$

wherein I is the inertia force caused to act on the vehicle by the application of the brakes and regarded as positive if acting towards the other end of the vehicle, $h$ is the height of the center of gravity of the vehicle, and $w$ is the wheelbase of the vehicle, the force acting to move the wheels down with respect to the frame if the expression $$I\frac{h}{w}$$

is positive and to move the wheels up with respect to the frame if the expression is negative.

4. In a motor vehicle having four wheel brakes and a spring supported frame, the combination of a front suspension and a rear suspension, in which the rear suspension and braking system has a linkage proportioned so that the retarding force caused by the rear brakes and the decrease in pressure of the ground under the rear wheels when the brakes are applied and throw the weight of the vehicle forward onto the front wheels are transmitted to the frame by the linkage as a pull down and back towards where the rear wheels touch the ground at an angle with the horizontal whose tangent is equal to $$\frac{hR}{w(F+R)}$$

and in which the front suspension comprises means for guiding the centers of the front wheels with respect to the frame in paths which are tangent to or lie in a plane perpendicular to the longitudinal axis of the vehicle, brake drums connected to rotate with the front wheels, brake anchor plates associated with the front brake drums and rotatable relative to the frame, and linkage interconnecting the front wheels and the brake anchor plates and the frame so as to cause rotation of the anchor plates towards the rear of the vehicle as the front wheels rise relative to the frame, the angle measured in radians through which the anchor plates are rotated for each inch of rise of the wheels being equal to $$\frac{hF}{rw(F+R)}$$

the meanings of the symbols being:

$h$ is the height of the center of gravity,
$w$ is the wheelbase,
$r$ is the radius of the wheels,
$F$ is the braking force on the front wheels with any given application of the brakes, and
$R$ is the braking force on the rear wheels with the same application of the brakes.

5. In a motor vehicle having four wheel brakes and a spring supported frame, the combination of a front suspension and a rear suspension, in which the front suspension and braking system has a linkage proportioned so that the retarding force caused by the front brakes and the increase in the pressure of the ground under the front wheels when the brakes are applied and throw the weight of the vehicle forward onto the front wheels are transmitted to the frame by the linkage as a thrust up and back from where the front wheels touch the ground at an angle with the horizontal whose tangent is equal to $$\frac{hF}{w(F+R)}$$

wherein $h$ is the height of the center of gravity,
$w$ is the wheelbase,
$F$ is the braking force on the front wheels with any given application of the brakes, and
$R$ is the braking force on the rear wheels with the same application of the brakes, and in which the rear suspension comprises a pair of wheels mounted on an axle, braking mechanism for resisting rotation of the wheels relative to the axle, a pair of laterally spaced link members connecting the frame to pivots on the axle, and a wishbone link connected to the frame by two pivots and to the axle by a universal joint, the angle $\theta_2$ between a plane through the two pivots and the universal joint of the wishbone link and a horizontal plane through its rear pivots or joint being in accord with the following equation:

$$\text{tangent } \theta_2 = \frac{h(F+R)}{wR}\left(\frac{q-s}{q}\right) + \frac{s}{q}\text{ tangent }\theta_1$$

wherein:

$q$ is the height of the pivots on the axle of the laterally spaced link members,
$s$ is the height of the universal joint,
$\theta_1$ is the angle between a plane through the laterally spaced link members and a horizontal plane through their pivots to the axle, and the other symbols have the same meanings as given above.

6. In a motor vehicle, a frame, a pair of wheels near one end of the vehicle, a spring suspension for resiliently supporting the frame on the wheels, a second pair of wheels near the other end of the vehicle, means for guiding the center of the last mentioned wheels with respect to the frame in paths tangent to or lying in a plane perpendicular to the longitudinal axis of the vehicle, brakes for the wheels including brake drums connected to rotate with the second pair of wheels, brake anchor plates associated with the brake drums and rotatable relative to the frame, and linkage interconnecting the second pair of wheels and the brake anchor plates and the frame so as to cause rotation of the anchor plates towards the center of the vehicle as the second pair of wheels rises relative to the frame, the angle measured in radians through which the anchor plates are rotated for each inch of rise of the wheels being equal to $$\frac{hF}{rw(F+R)}$$

wherein $h$ is the height of the center of gravity,
$w$ is the wheelbase,
$r$ is the radius of the wheels,
$F$ is the braking force on the front wheels with any given application of the brakes, and
$R$ is the braking force on the rear wheels with the same application of the brakes.

7. A braking system for a vehicle having a frame resiliently supported near one end on a pair of wheels mounted on an axle and near the other end on another pair of wheels, comprising braking mechanism for resisting rotation of the first pair of wheels relative to the axle, a pair of laterally spaced link members connecting the frame to pivots on the axle, and a wishbone link connected to the frame by two pivots and to the axle by a universal joint, the angle $\theta_2$ between a plane through the two pivots and the universal joint of the wishbone link and a horizontal plane through its rear pivots or joint being in accord with the following equation:

$$\text{tangent } \theta_2 = \frac{h(F+R)}{wR}\left(\frac{q-s}{q}\right) + \frac{s}{q}\text{ tangent } \theta_1$$

wherein:

$q$ is the height of the pivots on the axle of the pair of laterally spaced link members,
$s$ is the height of the universal joint,
$\theta_1$ is the angle between a plane through the laterally spaced link members and a horizontal plane through their pivots to the axle,
$h$ is the height of the center of gravity,
$w$ is the wheelbase,
$R$ is the braking force on the wheels on the axle with any given application of the brakes, and
$F$ is the braking force on the other wheels with the same application of the brakes.

8. In a vehicle, a frame, a steering knuckle, a wheel carried by the steering knuckle, a spring suspension connecting the steering knuckle to the frame to transmit a part of the weight of the vehicle to the wheel while permitting the wheel and the steering knuckle to rise and fall relative to the frame, a braking mechanism including a brake drum connected to the wheel and a brake anchor plate, and means for rotating the brake anchor plate back and forth relative to the steering knuckle as the wheel and the steering knuckle rise and fall relative to the frame.

9. The combination recited in claim 8 and having a link connected to the spring suspension and forming at least a part of the means for rotating the brake anchor plate.

10. In a motor vehicle having four wheel brakes and a spring supported frame and having the braking effort unequally distributed between the front and the rear, the combination of a front suspension and a rear suspension as defined in claim 4.

11. A motor vehicle as defined in claim 6 and in which the braking effort is unequally distributed between the front and the rear wheels.

12. A braking system for a vehicle having a portion resiliently supported near one end on a first pair of wheels and near the other end on a second pair of wheels, comprising braking mechanism for resisting rotation of the first pair of wheels and including brake anchor plates, braking mechanism for resisting rotation of the second pair of wheels relative to the resiliently supported portion of the vehicle, and upper and lower link means connecting the brake anchor plates associated with the first pair of wheels to the resiliently supported portion of the vehicle, the angle $\theta_2$ between a plane through the upper link means and a horizontal plane being in accordance with the following equation:

$$\text{tangent } \theta_2 = \frac{h(F+R)}{wR}\left(\frac{q-s}{q}\right) + \frac{s}{q}\text{ tangent } \theta_1$$

wherein:

$q$ is the height of the pivotal connection of the lower link means to the brake anchor plates,
$s$ is the height of the pivotal connection of the upper link means to the brake anchor plates,
$\theta_1$ is the angle between a plane through the lower link means and a horizontal plane,
$h$ is the height of the center of gravity,
$w$ is the wheelbase,
$F$ is the fraction of the total braking force that is applied to the second pair of wheels, and
$R$ is the fraction of the total braking force that is applied to the first pair of wheels.

PAUL HEFTLER.